(12) United States Patent
Turlej et al.

(10) Patent No.: US 11,584,393 B2
(45) Date of Patent: Feb. 21, 2023

(54) METHOD AND SYSTEM FOR PLANNING THE MOTION OF A VEHICLE

(71) Applicant: Aptiv Technologies Limited, St. Michael (BB)

(72) Inventors: Wojciech Turlej, Cracow (PL); Mateusz Orlowski, Cracow (PL); Tomasz Wrona, Cracow (PL); Nikodem Pankiewicz, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 189 days.

(21) Appl. No.: 17/200,575

(22) Filed: Mar. 12, 2021

(65) Prior Publication Data
US 2021/0300413 A1 Sep. 30, 2021

(30) Foreign Application Priority Data

Mar. 25, 2020 (EP) .................................... 20165673

(51) Int. Cl.
*B60W 60/00* (2020.01)
*B60W 30/18* (2012.01)
*B60W 30/095* (2012.01)

(52) U.S. Cl.
CPC .... *B60W 60/0011* (2020.02); *B60W 30/0953* (2013.01); *B60W 30/0956* (2013.01); *B60W 30/18163* (2013.01); *B60W 60/0015* (2020.02)

(58) Field of Classification Search
CPC ......... B60W 60/0011; B60W 30/0953; B60W 30/0956; B60W 30/18163; B60W 60/0015; B60W 30/09; B60W 30/095
See application file for complete search history.

(56) References Cited

U.S. PATENT DOCUMENTS

| | | | |
|---|---|---|---|
| 6,393,362 B1 | 5/2002 | Burns | |
| 9,551,992 B1 | 1/2017 | Barton-Sweeney et al. | |
| 10,012,984 B2 * | 7/2018 | Berntorp | G05D 1/0214 |
| 10,139,828 B2 | 11/2018 | Ho et al. | |
| 11,390,300 B2 * | 7/2022 | Phillips | B60W 60/0011 |

(Continued)

FOREIGN PATENT DOCUMENTS

| | | |
|---|---|---|
| EP | 3380904 | 10/2018 |
| EP | 3617023 | 3/2020 |
| WO | 2003095278 | 11/2003 |

OTHER PUBLICATIONS

"Extended European Search Report", EP Application No. 20165673.3, dated Oct. 7, 2020, 8 pages.

(Continued)

*Primary Examiner* — Ryan Rink
(74) *Attorney, Agent, or Firm* — Sawtooth Patent Group PLLC

(57) ABSTRACT

A method for planning the motion of a vehicle includes: determining a nominal trajectory for the vehicle based on a desired maneuver to be carried out in a traffic space, on a current state of movement of the vehicle and on a detected state of a surrounding of the vehicle, and determining an abort trajectory branching off from the nominal trajectory and guiding the vehicle to a safe condition regardless of the desired maneuver, wherein the nominal trajectory and the abort trajectory are determined simultaneously using a single optimization process.

20 Claims, 3 Drawing Sheets

(56) References Cited

U.S. PATENT DOCUMENTS

| | | | |
|---|---|---|---|
| 2017/0199523 A1* | 7/2017 | Barton-Sweeney | ........................ B60W 30/0956 |
| 2017/0212513 A1* | 7/2017 | Iida | ....................... B60W 30/09 |
| 2017/0277193 A1* | 9/2017 | Frazzoli | ............. B60W 60/0011 |
| 2018/0052465 A1 | 2/2018 | Poledna et al. | |
| 2018/0251126 A1* | 9/2018 | Linscott | ............... G05D 1/0274 |
| 2019/0004522 A1 | 1/2019 | Zych | |
| 2019/0079523 A1 | 3/2019 | Zhu et al. | |
| 2019/0129420 A1* | 5/2019 | Yoshizaki | ......... B60W 60/0015 |
| 2019/0138000 A1* | 5/2019 | Hammond | ........... G05D 1/0212 |
| 2019/0143982 A1* | 5/2019 | Hashimoto | ..... B60W 30/18163 701/23 |
| 2019/0361454 A1 | 11/2019 | Zeng et al. | |
| 2020/0132488 A1* | 4/2020 | Slutskyy | ............. B60W 60/0011 |
| 2021/0078596 A1* | 3/2021 | Batkovic | ............. G01C 21/3453 |
| 2021/0253103 A1* | 8/2021 | Kumar | ................ B60W 60/001 |
| 2022/0089151 A1* | 3/2022 | Gyllenhammar | ..... B60W 30/09 |

OTHER PUBLICATIONS

Magdici, et al., "Fail-Safe Motion Planning of Autonomous Vehicles", Nov. 2016, pp. 452-458.

Nister, et al., "The Safety Force Field", Mar. 2019, 24 pages.

Pek, et al., "Computationally Efficient Fail-safe Trajectory Planning for Self-driving Vehicles Using Convex Optimization", Nov. 2018, 8 pages.

Shalev-Shwart, et al., "On a Formal Model of Safe and Scalable Self-Driving Cars", Oct. 27, 2018, 37 pages.

\* cited by examiner

METHOD AND SYSTEM FOR PLANNING THE MOTION OF A VEHICLE

CROSS-REFERENCE TO RELATED APPLICATION

This application claims priority to European Patent Application Number 20165673.3, filed Mar. 25, 2020, the disclosure of which is hereby incorporated by reference in its entirety herein.

BACKGROUND

The present disclosure relates to methods and systems for planning the motion of vehicles.

To ensure the safety of autonomous vehicles or vehicles equipped with advanced driver assistance systems (ADAS), it is required to plan the motion which is necessary to carry out a desired maneuver such as a lane change, a merge-in or a turn. The motion of vehicles may be mathematically described by trajectories. A trajectory is a function which represents the state of a moving object such as a vehicle over time. The state of the vehicle may include its position, its yaw rate, its velocity and/or its acceleration.

The social expectations regarding the efficiency and safety of advanced driver assistance systems and autonomous vehicles are extremely high. Collision avoidance must be guaranteed in every situation. Therefore, the generation of trajectories may be performed in consideration of possible trajectories of other traffic participants. However, if trajectories are determined based on a worst-case prediction of the behavior of other traffic participants, certain maneuvers can't be carried out.

Accordingly there is a need to provide a system and a method which are able to plan the motion of a vehicle in such a way that efficient and assertive maneuvers are enabled while, simultaneously, dangerous situations are reliably avoided.

SUMMARY

The present disclosure provides a computer-implemented method, a computer system, and a non-transitory computer readable medium according to the independent claims. Embodiments are given in the dependent claims, the description and the drawings.

In one aspect, the present disclosure is directed at a computer-implemented method for planning the motion of a vehicle, the method including the following steps carried out by computer hardware components: determining, via a motion planning module of a control system, a nominal trajectory for the vehicle based on a desired maneuver to be carried out in a traffic space, on a current state of movement of the vehicle and on a detected state of a surrounding of the vehicle, and determining, via the motion planning module of the control system, an abort trajectory branching off from the nominal trajectory and guiding the vehicle to a safe condition regardless of the desired maneuver, wherein the nominal trajectory and the abort trajectory are determined simultaneously using a single optimization process.

The nominal trajectory fulfills the main goal of the desired maneuver, for example a lane change, but may be or become unsafe. In this case, the abort trajectory may be output for execution. An abort trajectory doesn't fulfill the goal of the maneuver, but is safe even under adverse conditions. For example, an abort trajectory may represent a cancellation of a lane change or a safety braking on the current lane when a lane change is desired. Abort trajectories may also be called "fail-safe trajectories". The nominal trajectory may be based on the prediction of the most plausible or most probable behavior of the other road users. The abort trajectory may be based on a worst case prediction of the behavior of the other road users.

The nominal trajectory and the abort trajectory may be future trajectories, wherein "future" may be understood as to be after the determining of the trajectories.

Since the nominal trajectory and the abort trajectory are determined simultaneously using a common optimization process, the frequency of forced executions of abort trajectories is reduced. In contrast to a method wherein the nominal trajectory is determined independently of the abort trajectory and the abort trajectory is determined afterwards in a separate process, the single optimization process shapes the nominal trajectory under the influence of the abort trajectories, whereby the generation of adverse nominal trajectories may be avoided. In other words, the nominal trajectory may be forced to be easy to abort. Thus, frequent abortions of maneuvers are avoided. However, the basic ability to perform abortions of maneuvers for safety reasons is maintained.

The method may further include one or more of the following features: A set of at least two abort trajectories branching off from the nominal trajectory at different points in time may be determined along with the nominal trajectory in the single optimization process via the motion planning module of the control system. The set of abort trajectories may include at least three abort trajectories branching off from the nominal trajectory at equally spaced points in time. The optimization process may include the step of minimizing a cost function, wherein a cost term and a weight may be assigned to each of the abort trajectories of the set of abort trajectories and wherein the cost function may include a weighted sum of the cost terms. Different weights may be assigned to at least two of the abort trajectories of the set of abort trajectories. The weight assigned to a first abort trajectory branching off from the nominal trajectory at a first point in time may be higher than the weight assigned to a second abort trajectory branching off from the nominal trajectory at a second point in time which is later than the first point in time. The weights assigned to temporally subsequent abort trajectories of the set of abort trajectories may be gradually decreasing. The nominal trajectory may be determined as an output trajectory to be outputted to a vehicle control module unless one of the following conditions is fulfilled: the nominal trajectory turns out to be unsafe; and a point in time is reached where the last abort trajectory of all subsequent abort trajectories branches off from the nominal trajectory and the nominal trajectory is not confirmed to be safe.

One of the abort trajectories of the set of abort trajectories may be determined, via the motion planning module of the control system, as the output trajectory if one of the conditions (i) and (ii) is fulfilled. The first available abort trajectory may be determined as the output trajectory if condition (i) is fulfilled, wherein the first available abort trajectory branches off from the nominal trajectory at the earliest point in time after condition (i) is confirmed to be fulfilled. The last abort trajectory of all subsequent abort trajectories may be determined as the output trajectory if condition (ii) is fulfilled. The single optimization process may include a constrained nonlinear optimization process. The single optimization process may be iteratively executed.

According to another aspect, a set of at least two abort trajectories branching off from the nominal trajectory at different points in time is determined along with the nominal trajectory in the single optimization process via the motion planning module of the control system. Thus, the planning of the motion in partially unknown environments is simplified. High-risk maneuvers, which may be cancelled within a relatively long time horizon in case of need, may be planned and carried out. In particular, a potentially dangerous maneuver can be planned if a confirmation or a disproval of the safety of the maneuver is expected in the near future. If, for example, a change from a first lane to a second lane is desired and the occupancy of the second lane is not detectable due to an occlusion by another vehicle, it is not necessary to execute the earliest abort trajectory if a later abort trajectory may also guide the vehicle to a safe state. Before the starting point of the later abort trajectory is reached, it is possible that the occlusion is no longer present, the second lane is confirmed to be free and the maneuver may be finished as desired according to the nominal trajectory.

According to another aspect, the set of abort trajectories includes at least three abort trajectories branching off from the nominal trajectory at equally spaced points in time. This simplifies the calculation. A set of three to five abort trajectories has turned out to balance reliability and computational effort. The space between the starting points or branch-offs of the abort trajectories may be at least 100 ms and at most 2 s. According to an aspect, the interval between the starting points of the abort trajectories is 500 ms.

According to another aspect, the single optimization process includes the step of minimizing a cost function, wherein a cost term and a weight is assigned to each of the abort trajectories of the set of abort trajectories and wherein the cost function includes a weighted sum of the cost terms. The cost terms may be based on efficiency and comfort measures such as acceleration values. The following cost function $f(x)$ may be used to solve the single optimization problem:

$$f(x) = f_{\Gamma 0}(x) + \Sigma_{i=1,\ldots,N} w_i f_{\Gamma a\_ti}(x)$$

wherein x is a vector including motion state parameters such as position and velocity parameters, $f(x)$ is the overall cost function, $f_{\Gamma 0}(x)$ is the cost function of the nominal trajectory $\Gamma_0$, $f_{\Gamma a\_ti}(x)$ is the cost function for the abort trajectory $\Gamma_{a\_ti}$ branching off from the nominal trajectory $\Gamma_0$ at the point in time $t_i$ and $w_i$ is the weight of the abort trajectory $\Gamma_{a\_ti}$ branching off from the nominal trajectory $\Gamma_0$ at the point in time $t_i$.

According to another aspect, different weights are assigned to at least two of the abort trajectories of the set of abort trajectories via the motion planning module of the control system. The individual weights may be used to tune the control system of the vehicle in accordance with the needs of a customer. A parametrization of the comfort limits and comfort weights of subsequent abort trajectories enables an adjustment of a threshold between expected comfort measures and an assertiveness of planned trajectories in a partially unknown environment.

According to another aspect, the weight assigned to a first abort trajectory branching off from the nominal trajectory at a first point in time is higher than the weight assigned to a second abort trajectory branching off from the nominal trajectory at a second point in time which is later than the first point in time. Assertive maneuvers may thus be allowed due to a low weight for the costs of late abort trajectories, while early abort trajectories are kept comfortable for the passengers of the controlled vehicle due to a high weight for the costs. Early abortions of maneuvers, which are more likely to occur than late abortions, may result in relatively smooth and comfortable trajectories, while late abortions of maneuvers, which are less likely to occur, are still possible—although the comfort may be reduced. For example, sudden jerks or significant decelerations may be accepted in case of—rarely occurring—late abortions of maneuvers.

According to another aspect, the weights assigned to temporally subsequent abort trajectories of the set of abort trajectories are gradually decreasing.

According to another aspect, the nominal trajectory is determined, via the motion planning module of the control system, as an output trajectory to be outputted to a vehicle control module unless one of the following conditions is fulfilled:
the nominal trajectory turns out to be unsafe; and
a point in time is reached where the last abort trajectory of all subsequent abort trajectories branches off from the nominal trajectory and the nominal trajectory is not confirmed to be safe;
and wherein one of the abort trajectories of the set of abort trajectories is determined as the output trajectory if one of the conditions (i) and (ii) is fulfilled. Thereby, unsafe conditions are reliably excluded. The information regarding the question if the nominal trajectory is currently safe or unsafe may be represented by safety signals received from vehicle sensors.

According to another aspect, the first available abort trajectory is determined, via the motion planning module of the control system, as the output trajectory if condition (i) is fulfilled, wherein the first available abort trajectory branches off from the nominal trajectory at the earliest point in time after condition (i) is confirmed to be fulfilled. The earliest possible abort trajectory is usually the most comfortable solution for aborting a maneuver, because the motion composed of the nominal trajectory and the abort trajectory can be kept relatively smooth.

According to another aspect, the last abort trajectory of all subsequent abort trajectories is determined, via the motion planning module of the control system, as the output trajectory if condition (ii) is fulfilled. Thus, the last possible measure to achieve a safe condition is taken.

According to another aspect, the single optimization process includes a constrained nonlinear optimization process.

According to another aspect, the single optimization process is iteratively executed via the motion planning module of the control system. The single optimization process may be based on sequential quadratic programming.

In another aspect, the present disclosure is directed at a computer system, the computer system including a plurality of computer hardware components configured to carry out several or all steps of the computer-implemented method described herein.

The computer system may include a processing device, at least one memory device and at least one non-transitory data storage. The non-transitory data storage and/or the memory device may include a computer program for instructing the computer to perform several or all steps or aspects of the computer-implemented method described herein.

In another aspect, the present disclosure is directed at a vehicle including the computer system as described above.

In another aspect, the present disclosure is directed at a non-transitory computer readable medium including instructions for carrying out several or all steps or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
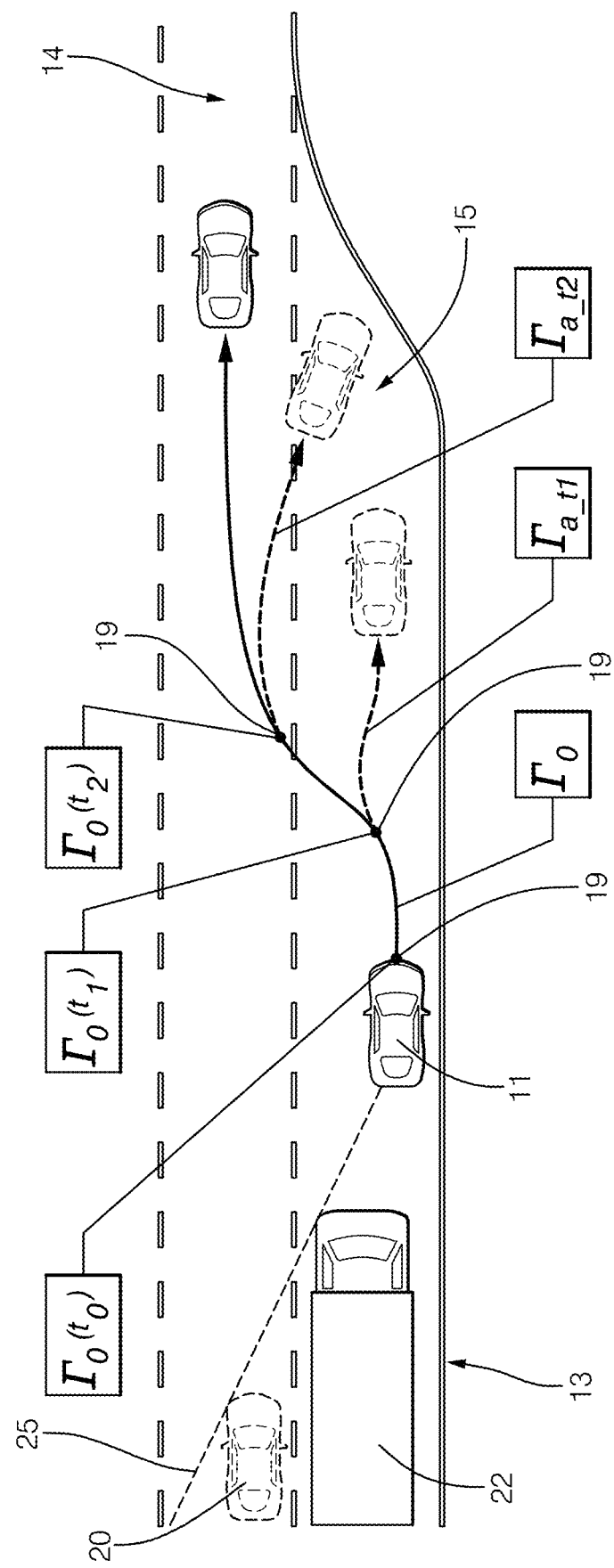
FIG. 1 an illustration of a host vehicle in a traffic space as well as trajectories representing the planning of a motion of the host vehicle according to various embodiments.

In FIG. 1, a host vehicle 11 is depicted which moves on a road 13 having a continuous lane 14 and an ending lane 15. As shown, the host vehicle 11 moves on the ending lane 15. The host vehicle 11 is provided with an electronic control system including a computer system, not shown. The control system may provide a lane change assistance functionality or may be configured as an autonomous driving system. Environment sensors (not shown) such as a camera, a Radar system and/or a Lidar system for monitoring the environment are installed in the host vehicle 11 and are connected to the control system.

The control system may include a behavior planning module and a motion planning module, for example in the form of integrated circuits. The behavior planning module is configured to send requests regarding desired maneuvers of the host vehicle 11, such as a lane following maneuver, a lane change maneuver or a merge-in maneuver, to the motion planning module. The requests may be driver initiated or may be generated by an autonomous logic.

According to various embodiments, the motion of the host vehicle 11 is planned by determining a nominal trajectory $\Gamma_0$ based on the desired maneuver, on the current state of movement of the host vehicle 11 and on the surrounding of the host vehicle 11 as detected by the environment sensors. In FIG. 1, the desired maneuver is a merge-in from the ending lane 15 to the continuous lane 14.

For the generation of the nominal trajectory $\Gamma_0$, a time horizon may be defined which corresponds to a range of the perception capability of the environment sensors. The time horizon is divided into equal time increments extending between points in time $t_0, t_1, t_2, \ldots$ to provide nodes 19 for the trajectory planning. Each node 19 may include a position in longitudinal direction, a position in lateral direction and a yaw angle of the host vehicle 11 at a point in time $t_i$.

Apart from the host vehicle 11, other traffic participants such as a passenger car 20 and a truck 22 move on the road 13. As illustrated by the line of sight 25, the passenger car 20 is occluded by the truck 22. Since the velocity of the passenger car 20 might be high enough for a collision with the lane changing host vehicle 11, it can't be guaranteed that the maneuver according to the nominal trajectory $\Gamma_0$ is safe. Therefore, a set of abort trajectories (fail-safe trajectories) $\Gamma_{a\_ti}$ branching off from the nominal trajectory $\Gamma_0$ and guiding the host vehicle 11 to a safe condition regardless of the desired maneuver are determined. In FIG. 1, two abort trajectories $\Gamma_{a\_t1}, \Gamma_{a\_t2}$ are shown. However, more than two abort trajectories may be generated for the nominal trajectory $\Gamma_0$. As shown, the abort trajectories $\Gamma_{a\_t1}, \Gamma_{a\_t2}$ branch off from the nominal trajectory $\Gamma_0$ at subsequent nodes 19, i.e. at different points in time $t_i$. The starting state of each abort trajectory $\Gamma_{a\_ti}$ is identical to the state of the nominal trajectory $\Gamma_0$ at the starting time of the abort trajectory $\Gamma_{a\_ti}$, i.e. $\Gamma_0(t_i)=\Gamma_{a\_ti}(t_i)$. According to the example shown, the abort trajectories $\Gamma_{a\_t1}, \Gamma_{a\_t2}$ guide the host vehicle 11 back to the ending lane 15. In other words, the abort trajectories $\Gamma_{a\_t1}, \Gamma_{a\_t2}$ correspond to an abortion of the lane change maneuver.

According to various embodiments, the nominal trajectory $\Gamma_0$ and the abort trajectories $\Gamma_{a\_t1}, \Gamma_{a\_t1}$ are determined simultaneously using a single nonlinear optimization process. The nonlinear optimization process includes the step of minimizing a cost function, for example the following cost function $f(x)$:

$$f(x) = f_{\Gamma 0}(x) + \sum_{i=1}^{N} w_i f_{\Gamma a\_ti}(x)$$

wherein x is a vector including motion state parameters such as position and velocity parameters, $f(x)$ is the overall cost function, $f_{\Gamma 0}(x)$ is the cost function of the nominal trajectory $\Gamma_0$, $f_{\Gamma a\_ti}(x)$ is the cost function for the abort trajectory $\Gamma_{a\_ti}$ branching off from the nominal trajectory $\Gamma_0$ at the point in time $t_i$ and $w_i$ is the weight of the abort trajectory $\Gamma_{a\_ti}$ branching off from the nominal trajectory $\Gamma_0$ at the point in time $t_i$.

The continuity and the smoothness of a motion which starts according to the nominal trajectory $\Gamma_0$ and continues with an abort trajectory $\Gamma_{a\_ti}$ may be enforced by equality constraints defined for each abort trajectory $\Gamma_{a\_ti}$. The equality constraints may include:

for $i$ in $i=1 \ldots \Gamma_0(t_i)=\Gamma_{a t_i}(t_i); \dot{\Gamma}_0(t_i)=\dot{\Gamma}_{a t_i}(t_i); \ddot{\Gamma}_0(t_i)=\ddot{\Gamma}_{a t_i}(t_i)$.

Figure 2:
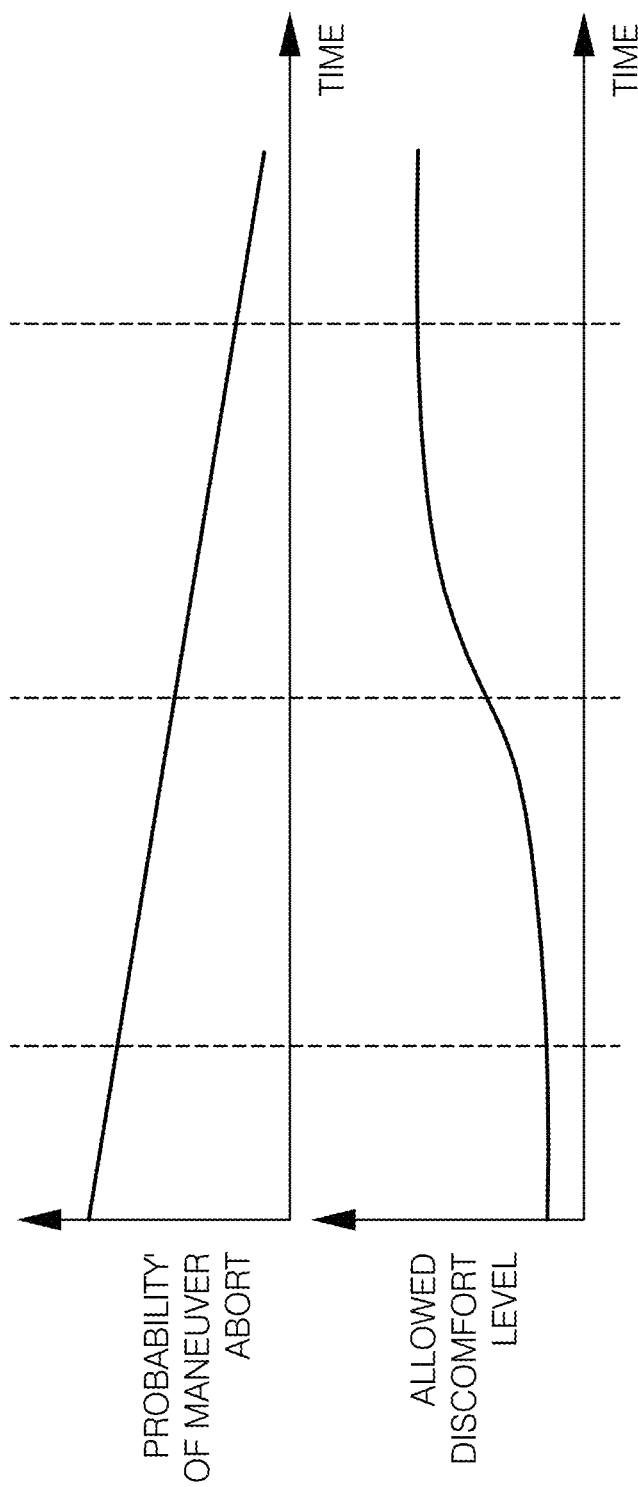
FIG. 2 a diagram showing the probability of an abortion of a maneuver as well as an allowed discomfort level within a time horizon.

The weights $w_i$ assigned to temporally subsequent abort trajectories $\Gamma_{a\_ti}$ are gradually decreasing. Therefore, the allowed discomfort level for a late abort trajectory is higher than the allowed discomfort level for an early abort trajectory. An exemplary qualitative level of allowed discomfort over the time horizon as tuned by the weights $w_i$ is shown in the lower panel of FIG. 2. The upper panel of FIG. 2 shows the continuously decreasing probability of an abortion of the maneuver over the time horizon. For rarely occurring late abortions, a higher level of discomfort, for example a jerk, is acceptable.

The nominal trajectory $\Gamma_0$ is executed, i.e. determined as an output trajectory to be outputted to a control module, until one of the following conditions is fulfilled:

(i) the nominal trajectory turns out to be unsafe, for example due to a detection of the passenger car 20 approaching with high velocity; and (ii) a point in time $t_2$ is reached where the last available abort trajectory $\Gamma_{a\_t2}$ branches off from the nominal trajectory $\Gamma_0$ and the nominal trajectory $\Gamma_0$ is neither confirmed to be safe nor to be unsafe.

If condition (i) is fulfilled, the first available abort trajectory, i.e. the abort trajectory planned for lowest $t_i > t_c$ is executed after reaching $t_i$, wherein $t_c$ is the point in time when the nominal trajectory $\Gamma_0$ is confirmed to be unsafe.

If condition (ii) is fulfilled, the last available abort trajectory is executed.

If the situation can be confirmed to be safe before reaching $t_2$, for example due to the detection of the target lane 14 being empty, the entire nominal trajectory $\Gamma_0$ is executed.

Figure 3:
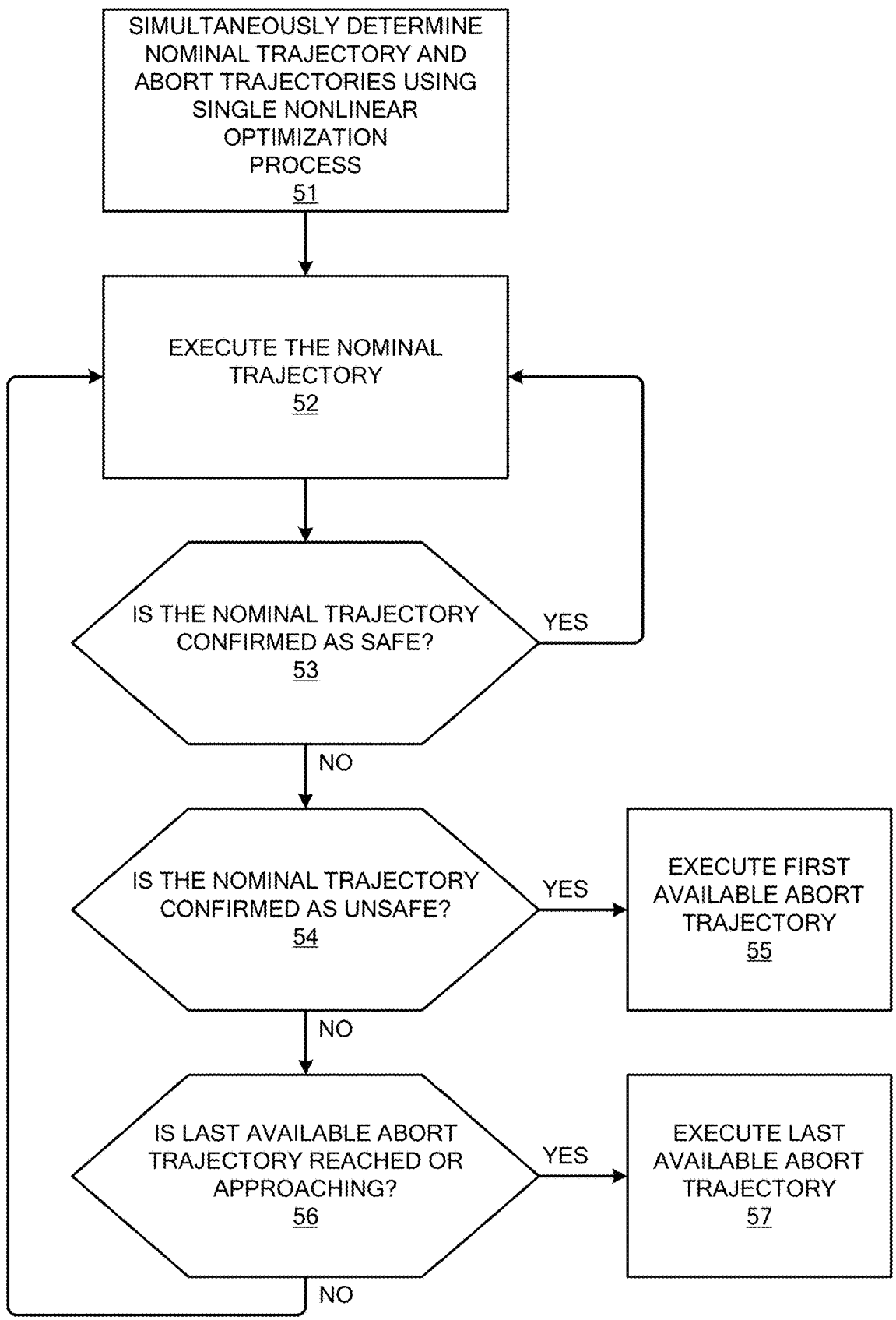
FIG. 3 a flow diagram illustrating a method for planning a motion of the host vehicle according to various embodiments.

FIG. 3 shows a flow diagram illustrating a method for planning a motion of the host vehicle 11 (FIG. 1) according to various embodiments. In step 51, the nominal trajectory $\Gamma_0$ and the abort trajectories $\Gamma_{a\_t1}$, $\Gamma_{a\_t2}$ are determined simultaneously using the single nonlinear optimization process as described above. In step 52, the nominal trajectory $\Gamma_0$ is executed. In step 53, it is checked if the nominal trajectory $\Gamma_0$ is confirmed to be safe. If it is confirmed to be safe, the process returns to step 52. If the nominal trajectory $\Gamma_0$ is not confirmed to be safe, it is checked in step 54 if the nominal trajectory $\Gamma_0$ is confirmed to be unsafe. If it is confirmed to be unsafe, the first available abort trajectory $\Gamma_{a\_ti}$ is executed in step 55. Otherwise, it is checked in step 56 if a point in time is reached or approaching where the last available abort trajectory $\Gamma_{a\_ti}$ branches off from the nominal trajectory $\Gamma_0$. If this point in time is reached or approaching, the last available abort trajectory $\Gamma_{a\_ti}$ is executed in step 57. Otherwise, the nominal trajectory $\Gamma_0$ is executed until the maneuver is finished. The method illustrated in FIG. 3 may be carried out by hardware components of the computer system of the host vehicle 11 (FIG. 1).

In contrast to an independent planning of the nominal trajectory $\Gamma_0$ and the abort trajectories $\Gamma_{a\_ti}$, wherein the nominal trajectory $\Gamma_0$ is planned before the abort trajectories $\Gamma_{a\_ti}$, a common planning in a single optimization process enables the nominal trajectory $\Gamma_0$ to be shaped in a way that states without any safe abort trajectories are avoided. The planning in a partially unknown environment is thus simplified. Complex maneuvers without complete information regarding the static and dynamic environment thanks to the guaranteed existence of safe abort trajectories may be undertaken. Assigning different comfort cost multipliers and constraints to subsequent abort trajectories planned with a nominal trajectory allows to tune the system in a way that assertive maneuvers are allowed while the most plausible early abort trajectories are kept comfortable for passengers of the host vehicle 11.

What is claimed is:

1. A computer-implemented method, the computer-implemented method comprising:
    determining, by computer-hardware components, a nominal trajectory for a vehicle based on a desired maneuver to be carried out in a traffic space, a current state of movement of the vehicle, and a detected state of a surrounding of the vehicle; and
    determining an abort trajectory branching off from the nominal trajectory and guiding the vehicle to a safe condition regardless of the desired maneuver, the nominal trajectory and the abort trajectory being determined simultaneously using a single optimization process, the single optimization process determining the nominal trajectory based on the abort trajectory.

2. The computer-implemented method of claim 1, the method further comprising:
    determining a set of at least two abort trajectories branching off from the nominal trajectory at different points in time along with determining the nominal trajectory in the single optimization process.

3. The computer-implemented method of claim 2, wherein the set of at least two abort trajectories includes at least three abort trajectories branching off from the nominal trajectory at equally spaced points in time.

4. The computer-implemented method of claim 2, wherein using the single optimization process comprises:
    assigning a cost term to the nominal trajectory and each of the abort trajectories of the set of at least two abort trajectories, the cost term for each of the abort trajectories being multiplied by a respective weight for each of the abort trajectories branching off from the nominal trajectory; and
    minimizing a cost function, the cost function being a weighted sum of the cost terms.

5. The computer-implemented method of claim 4, wherein assigning the cost term and the weight comprises assigning different weights to at least two of the abort trajectories of the set of at least two abort trajectories.

6. The computer-implemented method of claim 5, wherein a first weight assigned to a first abort trajectory branching off from the nominal trajectory at a first point in time is greater than a second weight assigned to a second abort trajectory branching off from the nominal trajectory at a second point in time which is later than the first point in time.

7. The computer-implemented method of claim 6, wherein the weights assigned to temporally subsequent abort trajectories of the set of at least two abort trajectories are gradually smaller.

8. The computer-implemented method of claim 2,
    wherein determining the nominal trajectory comprises determining the nominal trajectory as an output trajectory to be output to a vehicle control module unless at least one of the following conditions is satisfied:
        (i) the nominal trajectory is unsafe; or
        (ii) a point in time is reached where a last abort trajectory of all subsequent abort trajectories branches off from the nominal trajectory and the nominal trajectory is not confirmed to be safe; and
    wherein determining the set of at least two abort trajectories comprises determining one of the abort trajectories of the set of at least two abort trajectories as the output trajectory if at least one of the conditions (i) and (ii) is satisfied.

9. The computer-implemented method of claim 8, wherein determining the set of at least two abort trajectories comprises determining a first available abort trajectory as the output trajectory if condition (i) is satisfied, the first available abort trajectory branching off from the nominal trajectory at an earliest point in time after condition (i) is confirmed to be satisfied.

10. The computer-implemented method of claim 9, wherein determining the set of at least two abort trajectories comprises determining a last abort trajectory of all subsequent abort trajectories is determined as the output trajectory if condition (ii) is satisfied.

11. The computer-implemented method of claim 1, wherein the single optimization process comprises a constrained nonlinear process.

12. The computer-implemented method of claim 1, wherein using the single optimization process comprises iteratively executing the single optimization process.

13. A computer system, the computer system comprising a plurality of computer hardware components configured to plan a motion of a vehicle by:

determining a nominal trajectory for the vehicle based on a desired maneuver to be carried out in a traffic space, a current state of movement of the vehicle, and a detected state of a surrounding of the vehicle; and determining an abort trajectory branching off from the nominal trajectory and guiding the vehicle to a safe condition regardless of the desired maneuver, the nominal trajectory and the abort trajectory being determined simultaneously using a single optimization process, the single optimization process determining the nominal trajectory based on the abort trajectory.

14. The computer system of claim 13, the computer system further comprising the vehicle.

15. The computer system of claim 14, wherein the plurality of computer hardware components are further configured to determine a set of at least two abort trajectories branching off from the nominal trajectory at different points in time along with the nominal trajectory in the single optimization process.

16. The computer system of claim 15, wherein the set of at least two abort trajectories includes at least three abort trajectories branching off from the nominal trajectory at equally spaced points in time.

17. The computer system of claim 15, wherein the plurality of computer hardware components are further configured to use the single optimization process by:

assigning a cost term to the nominal trajectory and each of the abort trajectories of the set of at least two abort trajectories, the cost term for each of the abort trajectories being multiplied by a respective weight for each of the abort trajectories branching off from the nominal trajectory; and minimizing a cost function, the cost function being a weighted sum of the cost terms.

18. The computer system of claim 17, wherein different weights are assigned to at least two of the abort trajectories of the set of at least two abort trajectories.

19. The computer system of claim 18, wherein a first weight assigned to a first abort trajectory branching off from the nominal trajectory at a first point in time is greater than a second weight assigned to a second abort trajectory branching off from the nominal trajectory at a second point in time which is later than the first point in time.

20. A non-transitory computer-readable storage medium comprising computer-executable instructions that, when executed, cause computer hardware components to plan a motion of a vehicle, by:

determining a nominal trajectory for the vehicle based on a desired maneuver to be carried out in a traffic space, a current state of movement of the vehicle, and a detected state of a surrounding of the vehicle; and determining an abort trajectory branching off from the nominal trajectory and guiding the vehicle to a safe condition regardless of the desired maneuver, the nominal trajectory and the abort trajectory being determined simultaneously using a single optimization process, the single optimization process determining the nominal trajectory based on the abort trajectory.

* * * * *